United States Patent

[11] 3,556,445

| [72] | Inventor | Lawrence E. Werner |
| | | Grosse Pointe, Mich. |
| [21] | Appl. No. | 860,720 |
| [22] | Filed | Sept. 24, 1969 |
| [45] | Patented | Jan. 19, 1971 |
| [73] | Assignee | Chrysler Corporation |
| | | Highland Park, Mich. |
| | | a corporation of Delaware |

[54] AUTOMOBILE ENGINE MOUNTING AND METHOD
5 Claims, 5 Drawing Figs.

| [52] | U.S. Cl. | 248/7, |
| | | 248/15, 287/85 |
| [51] | Int. Cl. | F16f 15/08, |
| | | F16f 13/00 |
| [50] | Field of Search | 248/7, 9, |
| | | 10, 15, 18, 22, 358; 287/85 |

[56] References Cited
UNITED STATES PATENTS

| 1,731,540 | 10/1929 | Powell | 248/9 |
| 1,862,483 | 6/1932 | Lord | 248/10 |
| 3,082,999 | 3/1963 | Wolf et al. | 287/85X |
| 3,455,525 | 7/1969 | Waermo | 248/22X |

*Primary Examiner*—Edward C. Allen
*Assistant Examiner*—William H. Schultz
*Attorney*—Harness, Talburtt & Baldwin

ABSTRACT: At each of the forward sides of an automobile engine, a voided bushing assembly comprises an elastic bushing radially spacing and bonded to an outer tubular housing member of oval cross section and a coaxial inner tubular support member. The outer member is tightly secured by a forced fit within a pair of closely conforming oval holes in a pair of axially spaced channel sides respectively of a one-piece channel-shaped engine bracket secured to the engine. A one-piece channel-shaped body bracket associated with each bushing assembly has a pair of bracket arms spaced axially to receive the bushing assembly therebetween. A pair of upwardly opening guide slots within the latter arms respectively receive the axially opposite ends of a bolt in supported relationship on their bases, the bolt being releasably confined coaxially by friction within the inner tubular member. Enlarged clamping members at opposite ends of the bolt axially outward of the slotted bracket arms and oversize with respect to the slots to prevent passage therethrough are adjustable axially with respect to each other by screw action to clamp the latter arms tightly against the bushing assembly therebetween. Flanges of the latter arms closely overlie the tightened clamping members to limit their movement from the slot bases, but without interfering with their axial adjustability.

Prior to mounting the engine, the engine brackets with their bushing assemblies are secured to the engine. The bolts are inserted into the inner tubular members and the clamping members are arranged on the bolts so as to clear the flanges of the slotted bracket arms freely. The engine is then lowered into preassembled position by guiding the bushing assemblies between the slotted bracket arms and the bolts downwardly into the slots to their supported positions on the slot bases. The clamping members are then tightened to clamp the adjacent bracket arms against the bushing assemblies.

INVENTOR.
Lawrence E. Werner
BY
Harness, Talbott, & Baldwin
ATTORNEYS.

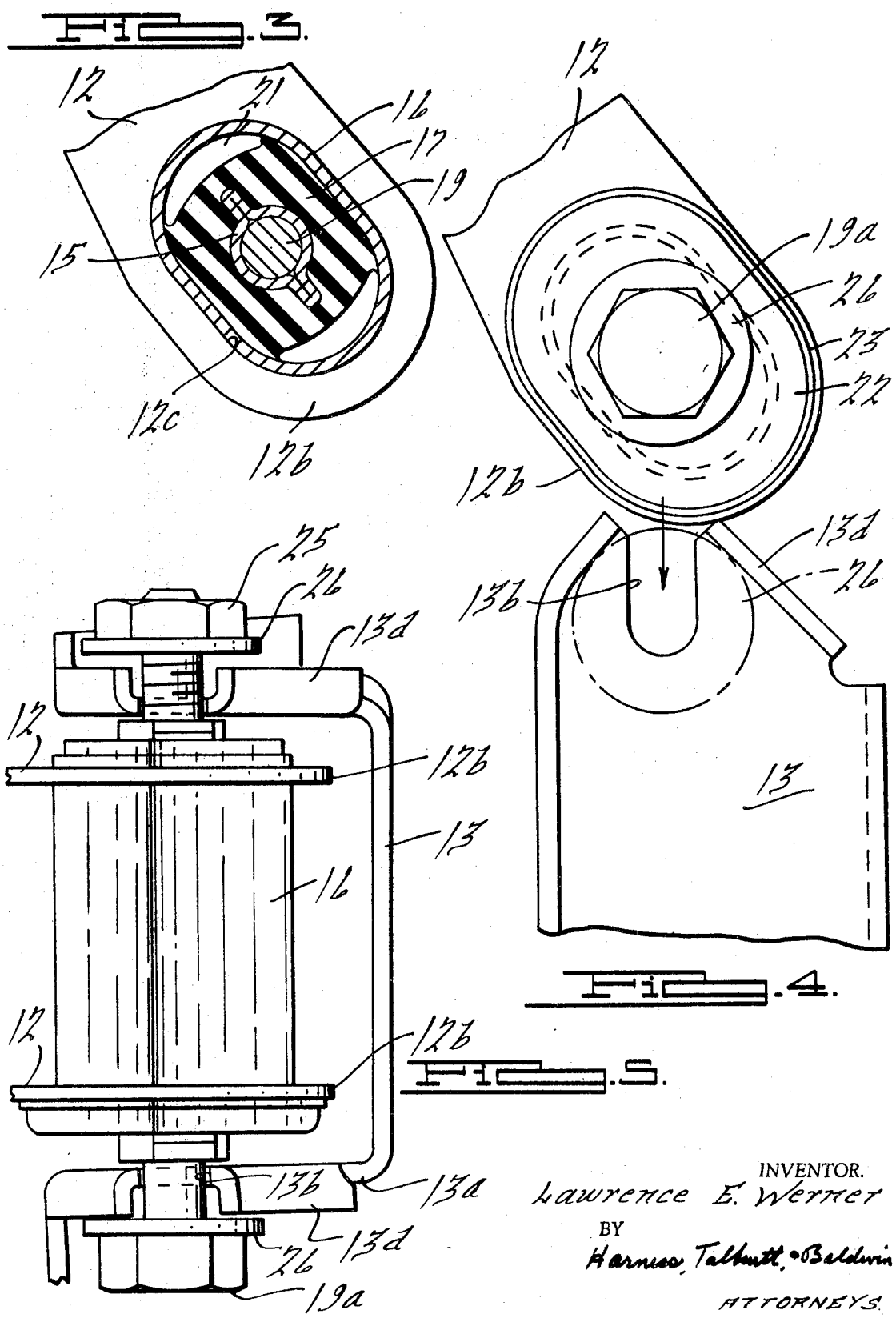

3,556,445

AUTOMOBILE ENGINE MOUNTING AND METHOD

BACKGROUND AND SUMMARY OF THE INVENTION

This invention relates to an improved vibration damping mounting structure and method for mounting an automobile engine on a vehicle body and has for an important object the provision of an engine mounting which is particularly simple and economical in structure and application, which utilizes a voided bushing to optimum advantage to obtain a fail safe structure in the event of bushing deterioration, to facilitate tuning and vibration isolation to accommodate engine modifications, to provide a positive resilient engine support for limiting all components of engine movements, and in particular to reduce engine roll significantly to approximately one-third of former requirements for comparable engine mountings without sacrificing vibration absorbing qualities.

By virtue of limiting engine roll and translatory movements, versatility of design and numerous cost savings are enabled, particularly in the design and arrangement of various couplings between the engine and body, such as water hoses for the engine coolant, fuel and air control linkages with the carburetor, and the transmission kickdown linkage, which heretofore were required to accommodate comparatively large relative engine movements, as for example approximately 6° of engine roll that can now be reduced to two or 2½°. Likewise such features as clearance between the air cleaner and hood is feasibly reduced, enabling a lowering of the hood as desired for low silhouette and for increased driver visibility.

Other and more specific objects are to provide such a bushing assembly comprising inner and outer tubular members having parallel axes and spaced by an intermediate elastic bushing of rubberlike material. The outer tubular member is forced into axially spaced aligned openings within the paired channel sides of a one-piece channel-shaped engine bracket adapted to be secured in predetermined fixed position to one side of the engine with the axes of the tubular members extending longitudinally of the automobile body. The outer tubular member is out-of-round and preferably of oval cross section conforming to the shape of the aligned bracket openings and dimensioned to effect an interference fit therein at its axially opposite ends, whereby relative rotation between the bushing assembly and engine bracket is prevented.

The above described structure provides a fail safe mounting in the event of deterioration of the elastic bushing, wherein the bolt shank and bushing assembly are closely confined against axially endwise movement by the channel sides or arms of the body bracket, against vertical movement by the bases of the axially spaced slots and by the clamping members, and against lateral movement by the sides of the slots.

Also the instant structure materially facilitates mounting of the automobile engine on the body. By guiding the bolts within the guide slots to their bases, a heavy engine that cannot be readily handled without the aid of a mechanical hoist may be quickly and accurately dropped into the preassembled position and properly located on the body. The assembly is completed merely by tightening the clamping means, which may simply comprise an enlarged head integral with one end of the bolt and an enlarged nut screwed on the other end.

The mounting described is particularly suitable for use as a front engine mounting, such that similar mountings are employed at opposite forward side portions of the engine with the bolts extending generally longitudinally of the vehicle body. The elastic bushing of each assembly is forced into the associated outer tubular member to compress the bushing in the direction of the shorter dimension of the oval cross section, and is provided with diametrically spaced axially extending voids within the larger cross-sectional dimension. As is well known to the art, the vibration damping and isolating characteristics of a mounting system employing voided bushings are determined by the ratio of the shear rate of the bushing across its voided or longer radial cross-sectional dimension to the compression rate of the bushing across its solid or shorter radial dimension, and the angular relationship of these radial dimensions relative to the principal inertial axis of the engine. Accordingly the present invention provides simple means for tuning the same bushing assembly effectively for use with various engines and vehicle bodies merely by rotating the axes of the aligned oval holes in the engine bracket into which the bushing assembly is pressed.

Other objects of this invention will appear in the following description and appended claims, reference being had to the accompanying drawings forming a part of this specification wherein like reference characters designate corresponding parts in the several views.

FIG. 3 is a transverse sectional view through the bushing assembly, taken in the direction of the arrows substantially along the line 3—3 of FIG. 2.

FIG. 4 is a fragmentary front elevational view showing the relationship between the engine and body brackets prior to assembly.

FIG. 5 is a plan view of the structure illustrated in FIG. 4.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
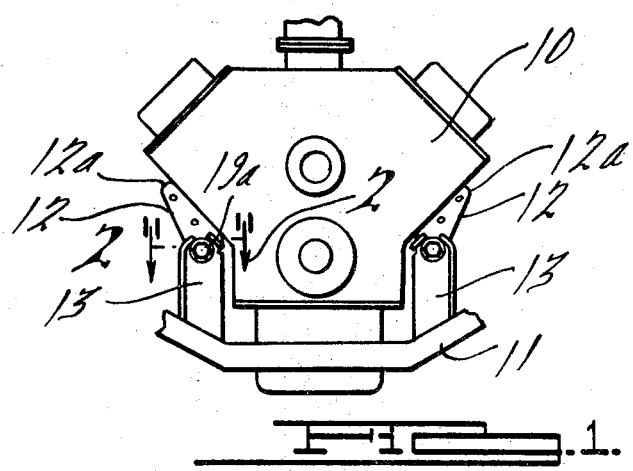
FIG. 1 is a schematic front elevational view of an engine mounted on a portion of an automobile body in accordance with the present invention.

Referring to the drawings, an automobile engine 10 is schematically illustrated in FIG. 1 mounted on a body cross member 11 of a vehicle by means of an engine bracket 12 and body bracket 13 interconnected by a voided bushing assembly 14 at opposite sides of the engine. The brackets 12 and 13 are each one-piece steel channel structures described in more detail below, the engine bracket 12 providing means 12a on its channel base for adjustable attachment to the engine 10, as for example by bolts. The bracket 13 is likewise suitably secured to the body member 11 in a predetermined position of alignment, as for example by bolts or by welding.

Each bushing assembly 14 comprises inner and outer steel tubular members 15 and 16 respectively spaced by an elastic bushing 17 of rubber-like material. The inner tubular member 15 comprises a tube flattened at diametrically opposite sides 18 to provide greater shear resistance within the bushing 17 and has a central axially extending circular opening for the shank of a bolt 19 of a screw threaded clamping means. The inner tubular member 15 is suitably bonded to the bushing 17 and may comprise an insert within the molded bushing 17 or may be forced therein after the bushing is molded.

The outer tubular shell or member 16 has an oval cross section enlarged in the direction of the flats 18 and is also bonded to the bushing 17 forced therein. In this regard, a thermosetting bonding resin may be applied to the parts to lubricate and facilitate insertion of the bushing 17 under compression into the confines of the outer shell 16. Thereafter the resin is cured to effect the bond. Each bushing 17 is compressed in its short radial direction and is relieved in the long radial direction of the flats 18 to provide axially extending voids 21. In the present instance each bushing 17 is provided with an integral annular locating flange 22 at one end which abuts a similar locating flange 23 of the member 16 to facilitate assembly of these members when they are forced together.

Each of the engine brackets 12 has a pair of axially spaced channel sides 12b containing a pair of aligned oval openings 12c respectively conforming closely to the outer contour of one of the members 16 to effect an interference fit therewith and to receive the latter when pressed therein, thereby to prevent relative rotation of the bushing assembly 14 within the bracket 12. If desired, the assembled member 16 and bracket channel sides 12b may be further secured against disassembly, as for example by staking.

The opposite channel sides or bracket arms 13a of each body bracket 13 are provided with a pair of upwardly opening guide slots 13b respectively adapted to receive the opposite ends of one of the bolts 19 therein. The opening of the slots 13b are chamfered at 13c to facilitate downward guided movement of the bolt 19. Each channel arm 13a adjacent opposite sides of the opening of its slot 13b is flanged axially outwardly at 13d. The bolt 19 is formed with a conventional hexagonal bolt head 19a at one end and is threaded at its opposite end to receive a nut 25. A pair of steel washers 26 oversize with respect to the associated slots 13b are provided integrally with the bolt head 19a and nut 25 respectively.

After the brackets 12 and 13 are properly secured to the engine 10 and body 11 in their desired fixed positions, with the associated channel sides or elements 12b and 13a spaced axially, or longitudinally of the vehicle body, and with a bushing assembly 14 pressed into and suitably retained within the mating oval holes 12c in each pair of channel sides 12b, a bolt 19 is inserted axially through each of the inner tubular members 15. A nut 25 with its integral washer 26 is loosely screwed on the threaded end of each bolt 19, which is adjusted axially within its member 15 so that the nut 25 and bolt head 19a with their respective integral washers 26 will freely clear the flanges 13d, FIG. 4, when the engine 10 is lowered into positions, as for example by means of a mechanical hoist. In this regard the bolt fits closely within the member 15 to avoid play therein and to engage the member 15 frictionally, so as to remain in its adjusted position in the event that during assembly it accidentally strikes one of the bracket arms 13a, for example, or the engine 10 is tilted.

As the engine 10 is lowered, the opposite ends of the bolts 19 are guided into the chamfered openings 13c and downwardly within the corresponding slots 13b to a preassembled position supported on the bases of the slots. The engine will be thus located by the bolts 19 supported on the bases of the slots 13b, whereupon the nuts 25 are tightened to draw the bolts 19 axially from their frictionally retained positions and clamp the washers 26 against the adjacent channel arms 13a, thereby to stress the latter tightly in a positive clamping action against the bushing assembly 14. By inserting the bolts 19 through the inner members 15 prior to lowering the engine to its partially assembled position no further adjustment or positioning of the engine is required at the latter position (except for tightening the nuts 25) and all problems relating to aligning and locating the brackets 12 and 13 with respect to each other, as for example to enable insertion of bolts 19 through aligned bolt holes in these brackets, are avoided.

Figure 2:
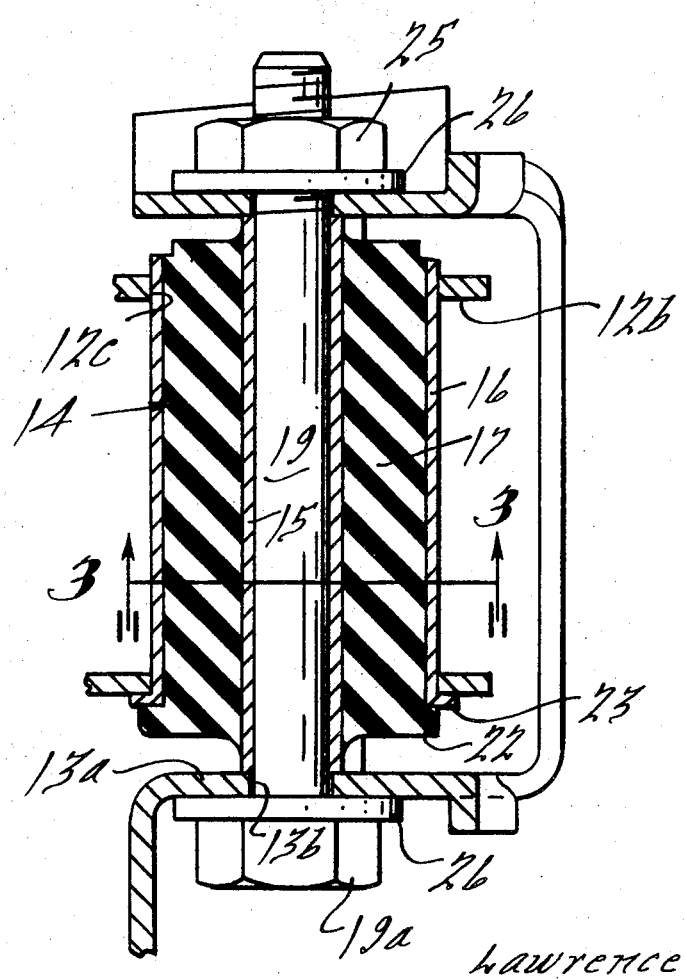
FIG. 2 is an enlarged longitudinal sectional view taken in the direction of the arrows substantially along the line 2—2 of FIG. 1.

As indicated in FIGS. 2 and 4, at the clamping position the washers 26 will closely underlie the flanges 13d to prevent upward movement of the bushing assembly 14. The lower portions of the slots 13b adjacent their bases conform closely to the associated bolt 19 to prevent its lateral displacement. Also each inner tubular member 15 extends axially beyond the associated outer tubular member 16 and is thus engaged by the channel arms 13a. In consequence the engine 10 is resiliently supported by the elastic bushing 17 for limited cushioned movement in any direction, whether linear, pivotal, or a combination of such movements. In the event of engine roll, the void 21 edgewise of the flat 18 extending in the direction of the roll will be partially closed as the elastic material of the bushing 17 yields to accommodate the roll. After approximately 2½° of roll, further engine roll will be prevented by bottoming of the latter flat against the adjacent portions of the bushing 17 along the large diameter of the oval outer housing member 16.

Engine vibration damping is determined by the relationship of the voids 21 with respect to the solid compressed portion of the bushing 17 along the diameter transverse to the voids 21. It is accordingly apparent that merely by rotating the alignment of the oval holes 12c in the channel sides 12b, the mounting may be readily modified to accommodate minor modifications of the engine or body structure without changing the structure of the bushing assembly 14 or appreciably modifying the mounting brackets 12 and 13. Likewise the same bushing assembly 14 may be employed with different optional engines in the same vehicle body.

I claim:

1. In a vibration damping means for mounting an automobile engine on a body member:
  A. a bushing assembly comprising inner and outer tubular members of rigid load sustaining material spaced radially by an intermediate elastic bushing bonded to said members,
  B. means for securing said outer tubular member in predetermined fixed relationship on said engine;
  C. a bolt insertable axially through the opening of said inner tubular member;
  D. bracket means of rigid load sustaining material comprising a pair of bracket elements normally spaced axially of said bushing assembly to receive the same freely therebetween and being yieldable for clamping said bushing assembly therebetween;
  E. a pair of bolt locating slots in said bracket elements respectively;
  F. each slot opening upwardly from a bolt supporting base and being aligned with the other slot to receive the opposite ends of said bolt extending axially through said inner tubular member;
  G. means for securing said bracket means in predetermined fixed relationship on said body member; and
  H. screw threaded clamping means for urging said bracket elements toward each other to clamp said bushing assembly therebetween, including:
    a. said bolt as a part thereof dimensioned to extend axially through said slots for confinement therein in supported relationship on the bases thereof; and
    enlarged clamping members on said bolt axially outwardly of said bracket elements, said clamping members being;
      1. oversize with respect to said slots to prevent passage therethrough, and
      2. being adjustable with respect to each other on said bolt to clamp said bracket elements therebetween tightly against said bushing assembly.

2. In the combination according to claim 1, said inner tubular member extending axially endwise in opposite directions beyond said outer tubular member, said bracket elements being engageable with the axially opposite ends of said inner tubular member to clamp the same axially therebetween to comprise the sole means for clamping said bushing assembly upon tightening of said clamping means.

3. In the combination according to claim 1, said outer tubular member being out-of-round in cross section transverse to the axis of the opening therethrough, said means for securing said outer tubular member on said engine comprising a channel bracket attachable to said engine and having spaced channel sides containing aligned out-of-round holes dimensioned to receive and conform closely to the axially opposite ends of said out-of-round outer tubular member with an interference fit.

4. In the combination according to claim 1, said bolt and inner tubular member having cooperating portions for frictionally retaining said bolt in position within the opening of said inner tubular member during assembly prior to tightening of said clamping means.

5. In the combination according to claim 1, said bracket elements having axially outwardly directed flanges closely overlying said enlarged clamping members when the latter are clamped tightly against said bracket elements, thereby to limit upward movement of said clamping means within said slots.